United States Patent
Rizet et al.

(10) Patent No.: US 8,638,007 B2
(45) Date of Patent: Jan. 28, 2014

(54) CONVERTER DEVICE AND UNINTERRUPTIBLE POWER SUPPLY PROVIDED WITH SUCH A DEVICE

(75) Inventors: Corentin Rizet, Francin (FR); Alain Lacarnoy, Saint Nazaire les Eymes (FR)

(73) Assignee: MGE UPS, Saint Ismier (FR)

( * ) Notice: Subject to any disclaimer, the term of this patent is extended or adjusted under 35 U.S.C. 154(b) by 565 days.

(21) Appl. No.: 12/926,003

(22) Filed: Oct. 20, 2010

(65) Prior Publication Data
US 2011/0109162 A1    May 12, 2011

(30) Foreign Application Priority Data
Nov. 6, 2009 (FR) ...................................... 09 05336

(51) Int. Cl.
*H02J 9/00* (2006.01)
(52) U.S. Cl.
USPC .......................................................... 307/64
(58) Field of Classification Search
USPC .......................................................... 307/64
See application file for complete search history.

(56) References Cited

U.S. PATENT DOCUMENTS

| | | | |
|---|---|---|---|
| 5,274,542 A | 12/1993 | Tanaka et al. | 363/96 |
| 6,353,547 B1 | 3/2002 | Jang et al. | 363/132 |
| 2007/0216228 A1* | 9/2007 | Johnson et al. | 307/64 |
| 2010/0072819 A1* | 3/2010 | Lee et al. | 307/77 |
| 2011/0044077 A1* | 2/2011 | Nielsen | 363/37 |

FOREIGN PATENT DOCUMENTS

WO    WO2009/124564    10/2009

OTHER PUBLICATIONS

Guedouani, R. et al, "Control of Capacitor Voltage of Three Phase Five-Level NPC Voltage Source Inverter. Application to Inductor Motor Drive," Electrical Machines and Power Electronics, 2007, ACEMP '07, International Aegean Conference on, 2007 IEEE, pp. 794-799.
Ceglia, G. et al, "A New Multilevel Inverter Topology," Proceedings of the Fifth IEEE International Caracas Conference on Devices, Circuits and Systems, Dominican Republic, Nov. 3-5, 2004, 2004 IEEE, pp. 212-208.
Rodriguez, J., et al, "Multilevel Converters: An Enabling Technology for High-Power Applications," Proceedings of the IEEE, vol. 97, No. 11, Nov. 2009, pp. 1786-1817.

* cited by examiner

*Primary Examiner* — Robert L. Deberadinis
(74) *Attorney, Agent, or Firm* — Steptoe & Johnson LLP

(57) ABSTRACT

A converter to supply an AC voltage and current from three DC voltages comprising two switching units provided with first switching means connected between an input and a switching output, said converter comprising, for each switching unit, second switching means connected between said switching unit and a modulated signal output, and a switching aid circuit, said converter comprising control means acting on the second switching means associated with the switching unit that is connected to the voltage input of opposite sign to the sign of said AC voltage to establish turn-off of said second switching means when said AC voltage and said AC current are of opposite signs.
An uninterruptible power supply comprising the converter described above.

12 Claims, 12 Drawing Sheets

CONVERTER DEVICE AND UNINTERRUPTIBLE POWER SUPPLY PROVIDED WITH SUCH A DEVICE

BACKGROUND OF THE INVENTION

The invention relates to the field of converters such as inverters, for example those used in uninterruptible power supplies, in particular high-power uninterruptible power supplies, i.e. with a power that is generally comprised between about 100 and 500 kVA.

The invention more particularly relates to a converter device enabling an AC voltage and current to be supplied by filtering pulses obtained on a modulated signal output from three substantially DC voltages available on a reference voltage line and on two voltage inputs of opposite signs, said device comprising two switching units connected between said reference voltage line and respectively one and the other of said inputs, each switching unit comprising first switching means connected between the input to which said switching unit is connected and a switching output of said switching unit to supply pulses having the same sign as that of the voltage available on said input by main turn-ons and turn-offs of said first switching means, said device comprising, for each switching unit, second switching means associated with said switching unit and connected between said switching unit and said modulated signal output, and first control means acting on said second switching means to establish turn-on of said second switching means when the sign of said AC voltage is the same as that of the voltage on the input to which said switching unit is connected.

The invention also relates to an uninterruptible power supply comprising a power supply input on which an AC input voltage is applied, a rectifier connected to said input, two substantially DC voltage lines of opposite signs connected on output of said rectifier, an inverter connected to said voltage lines of substantially DC voltage and comprising an output designed to supply a backed-up voltage.

STATE OF THE ART

Uninterruptible power supplies are commonly developed to improve their efficiency and to reduce audible nuisances generated by switching frequencies that are often low, i.e. about a few thousand hertz. In this context, it has been shown that it was interesting to use uninterruptible power supplies presenting topologies on several levels, generally three levels, using components with enhanced performances enabling the problem evoked above to be palliated.

With reference to FIG. 1, such an uninterruptible power supply 11 comprises a mains supply input 12 to which an electrical mains supply is connected and which enables a variable input voltage which is more often than not AC to be applied to said uninterruptible power supply 11. The uninterruptible power supply also comprises a mains supply output 13 to which loads are connected and which enables an electric power supply called backed-up power supply i.e. an electric power supply for which the voltage and frequency are controlled, to be supplied. The uninterruptible power supply 11 comprises a rectifier or an AC/DC converter 15 connected to the mains supply input 12, substantially DC voltage lines 16, 17, and a voltage reference 18 connected on output of the rectifier. Uninterruptible power supply 11 also comprises a DC/DC converter 19 comprising electric power storage means 20, said converter and said storage means being connected to substantially DC voltage lines 16, 17. Uninterruptible power supply 11 further comprises decoupling capacitors 21, 22 connected between voltage reference 18 and substantially DC voltage lines 16, 17, and an inverter or reversible DC/AC converter 23 connected between said lines 16, 17 and mains supply output 13. Converter 23 of uninterruptible power supply 11 comprises six switching cells. More precisely, converter 23 comprises two switching cells for each of the three phases, one dedicated to the positive half-waves and the other dedicated to the negative half-waves.

As can be seen in FIG. 1, uninterruptible power supply 11 presents a topology on three levels, i.e. rectifier 15 supplies a substantially DC voltage on three levels, that is to say a positive level on line 16, a negative level on line 17 and a reference level on voltage reference 18. In parallel, DC/AC converter 23 supplies an AC voltage from these three DC voltage levels. The positive and negative levels generally present the same electric potential in absolute value substantially equal to half the voltage U between lines 16 and 17.

With reference to FIG. 2, two cells of DC/AC converter 23 are represented for a given phase. The converter device thus partially represented supplies an AC voltage VS and an AC current IS on a phase line. AC voltage VS and current IS are obtained by filtering pulses obtained on a modulated signal output SM from three substantially DC voltage levels −U/2, UREF, U/2 available on a reference voltage line REF and on two voltage inputs P, N of opposite signs. The filtering means used comprise an inductance L connected between the modulated signal output SM and AC voltage VS and current IS output. The filtering means further comprise a capacitor C connected between said AC voltage VS and current IS output and a voltage reference point presenting the same electric potential as reference voltage line REF.

The converter device represented in FIG. 2 comprises two switching units UC1, UC4 controlled by means of a control unit CD1 represented separately in FIG. 3. Switching units UC1, UC4 are connected between reference voltage line REF and respectively one and the other of said inputs P, N. Each switching unit UC1, UC4 comprises first switching means, i.e. a transistor T1, T4, connected between voltage input P, N to which said switching unit is connected and a switching output S1, S4 of said switching unit. Transistors T1, T4 can also be called main transistors. By means of this set-up, the pulses on modulated signal output SM are obtained by a succession of main turn-ons and turn-offs of transistors T1, T4 performed by means of control unit CD1. When transistor T1, T4 of a switching unit UC1, UC4 is in main turned-on state, the voltage on switching output S1, S4 of said switching unit is equal to the DC voltage −U/2, U/2 of voltage input P, N to which said switching unit is connected. Each switching unit UC1, UC4 further comprises a diode DC2, DC3 connected between reference voltage line REF and switching output S1, S4 of said switching unit to establish a voltage equal to said reference voltage UREF on said switching output when a main turn-off takes place. In this way, transistors T1, T4 of each switching unit UC1, UC4 enable pulses having the same sign as that of the voltage available on voltage input P, N of said switching unit to be supplied on their respective switching outputs S1, S4.

As can be seen in FIG. 3, transistors T1, T4 are controlled from control signals F1, F2. The latter are obtained from AC voltage VS using well known pulse width modulation techniques.

More precisely, control signal F1, respectively F2 is applied to the control input of transistor T1, respectively T4. When the amplitude of control signal F1, F2 applied on the control input of a transistor T1, T4 is equal to zero, said transistor is turned-off, and when this amplitude is equal to one, said transistor is turned-on. When AC voltage VS is positive, respectively negative, main turn-on of transistor T1, respectively T4, enables a voltage with an amplitude that is equal to positive DC voltage +U/2, respectively negative DC voltage −U/2, to be supplied on switching output S1, respectively S4. In the same way, when AC voltage VS is positive, respectively negative, main turn-off of transistor T1, respectively T4, enables diode DC2, respectively DC4, to be turned-on, which enables a voltage with an amplitude that is equal to zero to be supplied on switching output S1, respectively S4. This succession of main turn-ons and turn-offs applied on transistor T1, respectively T4, thereby enables pulses of variable width having an amplitude substantially equal to DC voltage U/2 and having a positive sign, respectively a negative sign, to be obtained on switching output S1, respectively S4.

For each switching unit UC1, UC4, the conversion device represented in FIG. 2 further comprises second switching means, i.e. transistors T2, T3 connected between said switching unit and modulated signal output SM. Transistors T2, T3 enable switching unit UC1, UC4 to be connected to modulated signal output SM according to the sign of AC voltage VS, i.e. they enable switching output S1, S4 of said switching unit UC1, UC4 to be connected to modulated signal output SM.

As can be seen in FIG. 3, control signal F1, respectively F2, is inverted by means of first control means, i.e. an inverter 52, respectively 51. The signal on output from inverter 52, respectively 51, is applied to the control input of transistor T3, respectively T2. When AC voltage VS is positive, respectively negative, control signal F2, respectively F1, is equal to zero and the signal on output from inverter 51, respectively 52, is therefore equal to one. This results in transistor T2 being turned-on, when AC voltage VS is positive, so that switching output S1 of switching unit UC1 is connected to modulated signal output SM. In the same way, when AC voltage VS is negative, it is transistor T3 that is turned-on so that switching output S4 of switching unit UC4 is connected to modulated signal output SM. By means of these first control means 51, 52, it is possible to supply pulses of variable width, having an amplitude substantially equal to DC voltage U/2 and having a sign identical to the sign of AC voltage VS, on modulated signal output SM. In other words, first control means 51, 52 enable switching output S1, S4 of switching unit UC1, UC4 to be connected to modulated signal output SM when the sign of AC voltage VS is the same as that of the voltage available on the voltage input of said switching unit. Consecutive filtering of these pulses on modulated signal output SM, by means of inductance L and capacitance C, thereby enables AC voltage VS to be supplied.

As described above, the converter device represented in FIG. 2 enables operation during the active phases, that is to say when AC voltage VS and current IS are of the same sign. During the active phases, the voltage pulses on switching outputs S1, S4 are therefore obtained by means of switching units UC1, UC4 described above. This same converter device also comprises additional means described in the following enabling operation during the reactive phases, that is to say when AC voltage VS and current IS are of opposite signs.

In the converter device represented in FIG. 2, the means enabling operation during the reactive phases comprise diodes referenced D1, D2, D3, D4 connected in parallel with the transistors respectively referenced T1, T2, T3, T4. More precisely, each diode presents a cathode and an anode respectively connected to the emitter and collector of the transistor to which it is connected in parallel. These diodes D1, D2, D3, D4 are thus often referred to as antiparallel diodes.

When AC voltage VS is positive and AC current IS is negative, switching is performed by means of second switching means associated with switching unit UC4, i.e. transistor T3, and also by means of diodes D1, D2 connected in parallel with the first and second switching means associated with the cell of switching unit UC1, i.e. connected in parallel with transistors T1 and T2 respectively. When AC voltage VS is negative and AC current IS is positive, switching takes place on the one hand by means of the second switching means associated with switching unit UC1, i.e. transistor T2, and also by means of diodes D4, D3 connected in parallel with the first and second switching means associated with switching unit UC1, i.e. connected in parallel with transistors T4 and T3 respectively.

More precisely, when transistor T3, respectively T2, is turned-on, AC current IS flows via said transistor and diode DC3, respectively DC2. This results in the voltage on modulated signal output SM being substantially equal to reference voltage REF. Inversely, when transistor T3, respectively T2, is turned-off, AC current IS flows via diodes D2, D1, respectively diodes D3, D4, which results in the voltage on modulated signal output SM being substantially equal to DC voltage U/2, respectively −U/2.

Thus, during the active phases, to establish pulses on modulated signal output SM, first switching means T1, T4 of switching units UC1, UC4 are essentially used. During the reactive phases, establishment of pulses on modulated signal output SM essentially uses second switching means T3, T2 associated with switching units UC4, UC1.

When uninterruptible power supply 11 represented in FIG. 1, and in particular the converter device represented in FIGS. 2 and 3, is in use, the switching speeds of transistors T1 to T4 and the high currents flowing in the latter impose considerable structural constraints. This results in the switching losses in these active power electronics components limiting the increase of the switching frequency. One technical problem is to limit these switching losses during the active phases of operation of the converter device, while at the same time ensuring satisfactory operation during the reactive phases.

SUMMARY OF THE INVENTION

The object of the invention is to provide a solution to the problems of converter devices of the prior art by proposing a converter device enabling an AC voltage and an AC current to be supplied by filtering pulses obtained on a modulated signal output from three substantially DC voltages available on a reference voltage line and on two voltage inputs of opposite signs, said device comprising two switching units connected between said reference voltage line and respectively one and the other of said inputs, each switching unit comprising first switching means connected between the input to which said switching unit is connected and a switching output of said switching unit to supply pulses having the same sign as that of the voltage available on said input by main turn-ons and turn-offs of said first switching means, said device comprising, for each switching unit, second switching means associated with said switching unit and connected between said switching unit and said modulated signal output, and first control means acting on said second switching means to establish turn-on of said second switching means when the sign of said AC voltage is the same as that of the voltage on the input to which said switching unit is connected, said device being characterized in that, for each switching unit, it comprises a switching aid circuit of said switching unit connected between the input to which said switching unit is connected and the switching output of said switching unit to establish a switching voltage of said first switching means that is substantially equal to zero, before any main turn-on of the first switching means of said switching unit, and that for each switching unit said device comprises second control means acting on the second switching means associated with the switching unit that is connected to the voltage input of the same sign as that of said AC voltage to establish turn-off of said second switching means when said AC voltage and said AC current are of opposite signs.

Each switching unit preferably further comprises a diode connected between the reference voltage line and the switching output of said switching unit to establish a voltage equal to said reference voltage on said switching output when main turn-off takes place.

The second switching means of each switching unit are preferably connected between the switching output of said switching unit and the modulated signal output. Alternatively, the switching output of each switching unit is connected directly to the modulated signal output, and the second switching means of each switching unit are connected in series between the diode and said modulated signal output.

Each switching unit is preferably controlled by means of a pulse width modulation control signal the amplitude of which is maintained at a value substantially equal to zero when the sign of the AC voltage is the opposite of the sign of the voltage on the input to which said control unit is connected, and the first control means acting on the second switching means associated with one of the switching units comprise an inverter connected between the control input of said second switching means and an input point of the control signal of the other switching unit. Advantageously, the second control means acting on the second switching means associated with a switching unit comprise between the control input of said second switching means and the input point of the control signal of the other switching unit:
  means for testing the sign of the AC current with respect to that of the voltage on the input to which said first switching unit is connected, and
  a logic "AND" boolean operator provided with two inputs connected to an output of the inverter of the first control means of said second switching means and to an output of said means for testing and with an output to establish turn-off of said second switching means when said AC current is of opposite sign to that of the voltage on the input to which said first switching unit is connected.

The switching aid circuit of each switching unit preferably comprises inductive means, branch-off means for shunting a current from the switching output to divert said current to said inductive means before main turn-on, and energy storage means connected in parallel on the diode of said switching unit to establish a resonance of said current in said inductive means before main turn-on. Advantageously, the inductive means of the switching aid circuit of each switching unit are essentially formed by a transformer connected to the switching output of said switching unit and comprising reverse-wound windings, and said branch-off means comprise auxiliary switching means directly connected between said inductive means and the voltage input to which said switching unit is connected. The transformer of the switching aid circuit of each switching unit advantageously comprises:
  a first winding connected between the switching output of said switching unit and the branch-off means of said switching aid circuit, and
  a second winding magnetically coupled to said first winding and connected between said switching output and the reference voltage line.

The transformer preferably presents a transformation ratio of less than one.

The switching aid circuit of each switching unit preferably comprises at least a first blocking diode connected between the first winding and the reference voltage line. Advantageously, the switching aid circuit of each switching unit comprises a second blocking diode connected between the second winding and the reference voltage line.

The converter device preferably comprises third control means acting on the first switching means of each switching unit, said third control means being connected between the input point of the pulse width modulation control signal of said switching unit and the control input of said first switching means, said third control means enabling a succession of main turn-ons and turn-offs of said first switching means to be commanded from said control signal, said third control means comprising a delay module designed to establish a delayed main turn-on after a period greater than a preset period. The converter device advantageously comprises fourth control means acting on the auxiliary switching means of the switching aid circuit of each switching unit, said fourth control means being connected between the input point of the pulse width modulation control signal of said switching unit and the control input of said auxiliary switching means, said fourth control means comprising a module designed to establish turn-on of said auxiliary switching means during a preset period.

The invention also relates to an uninterruptible power supply comprising a power supply input on which an AC input voltage is applied, a rectifier connected to said input, two substantially DC voltage lines of opposite signs connected on output of said rectifier, an inverter connected to said substantially DC voltage lines and comprising an output designed to supply a backed-up voltage, said power supply being characterized in that said inverter is a converter device as described in the above and supplies a backed-up AC voltage from substantially DC voltages.

BRIEF DESCRIPTION OF THE DRAWINGS

Other advantages and features will become more clearly apparent from the following description of particular embodiments of the invention, given as non-restrictive examples only and represented in the accompanying drawings.

DETAILED DESCRIPTION OF AN EMBODIMENT

Figure 4:
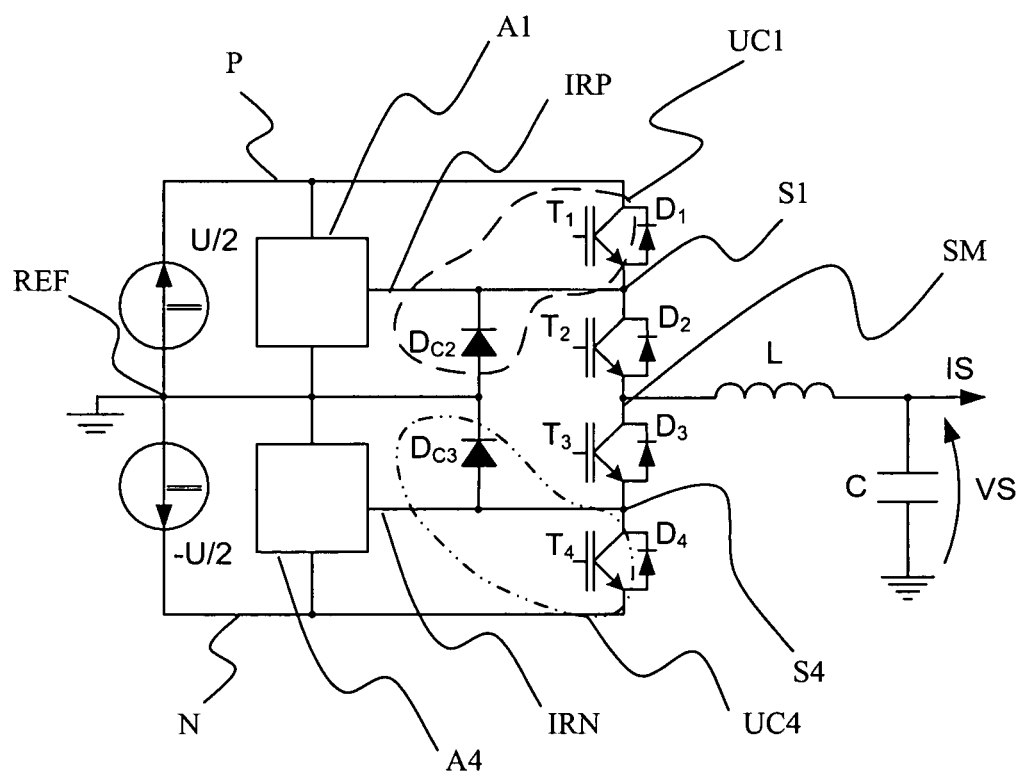
FIG. 4 schematically represents a converter device according to the invention.

With reference to FIG. 4, the converter device comprises a large number of elements that have already been described and which bear the same reference numbers. The converter device further comprises, for each switching unit UC1, UC4, a switching aid circuit A1, A4 of said switching unit connected between voltage input P, N to which said switching unit is connected and switching output S1, S4 of said switching unit. These switching aid circuits A1, A4 of each switching unit UC1, UC4 enable a switching voltage of first switching means T1, T4 of said switching unit that is substantially equal to zero to be established before main turn-on.

In the following, turn-on of switching means could also be qualified as triggering of said switching means. The term "main", associated with the terms turn-on, triggering or turn-off, can be used with reference to switchings of the first switching means T1, T4 with which the switching aid circuits interact to soften the switchings. The term "main" also enables the distinction to be made between switchings of the first switching means T1, T4 and those of second switching means T2, T3 or those of auxiliary switching means TX1, TX4.

Generally speaking, to establish pulses on modulated signal output SM, the switchings giving rise to losses in second switching means T2, T3 are less frequent than the switchings of first switching means T1, T4. The switching aid circuits are therefore generally designed to establish a switching voltage substantially equal to zero for switchings of first switching means T1, T4 only, i.e. during the active phases of operation.

To establish a switching voltage substantially equal to zero before main turn-on or triggering, switching aid circuit A1, A4 of switching unit UC1, UC4 involved generally comprises means for diverting a current IRP, IRN from switching output S1, S4 of said switching unit and for establishing a resonance of this current. These switching aid circuits A1, A4, generally designed for the active phases of operation, can in fact interact in unfavourable manner with second switching means T3, T2, during the reactive phases of operation.

For example, as described in detailed manner in the following, switching aid circuits A1, A4 can comprise energy storage means which act, during the reactive phases of operation, on the current flowing in second switching means T2, T3. More precisely, these energy storage means are generally arranged in such a way that, when turn-on of second switching means T2, T3 takes place, discharging of said energy storage means takes place via the whole of said second switching means, which requires over-dimensioning of these second switching means and of the energy storage means.

It has been found that by modifying control unit CD1, it was possible to use a switching aid circuit avoiding any over-dimensioning of second switching means T2, T3. For this, second control means described further on in detailed manner were added to control unit CD1 to act on second switching means T2, T3 associated with switching unit UC1, UC4 that is connected to input P, N. These second control means thereby enable turn-off of second switching means T2, T3 associated with switching unit UC1, UC4 that is connected to the voltage input of opposite sign from the sign of said AC voltage to be established when AC voltage VS and current IS are of opposite signs, i.e. during the reactive phases. In other words, when AC voltage VS and current IS are of opposite signs, the second control means act on second switching means T2, T3 associated with switching unit UC1, UC4 that is connected to input P, N to protect said switching unit from modulated signal output SM.

Figure 5:
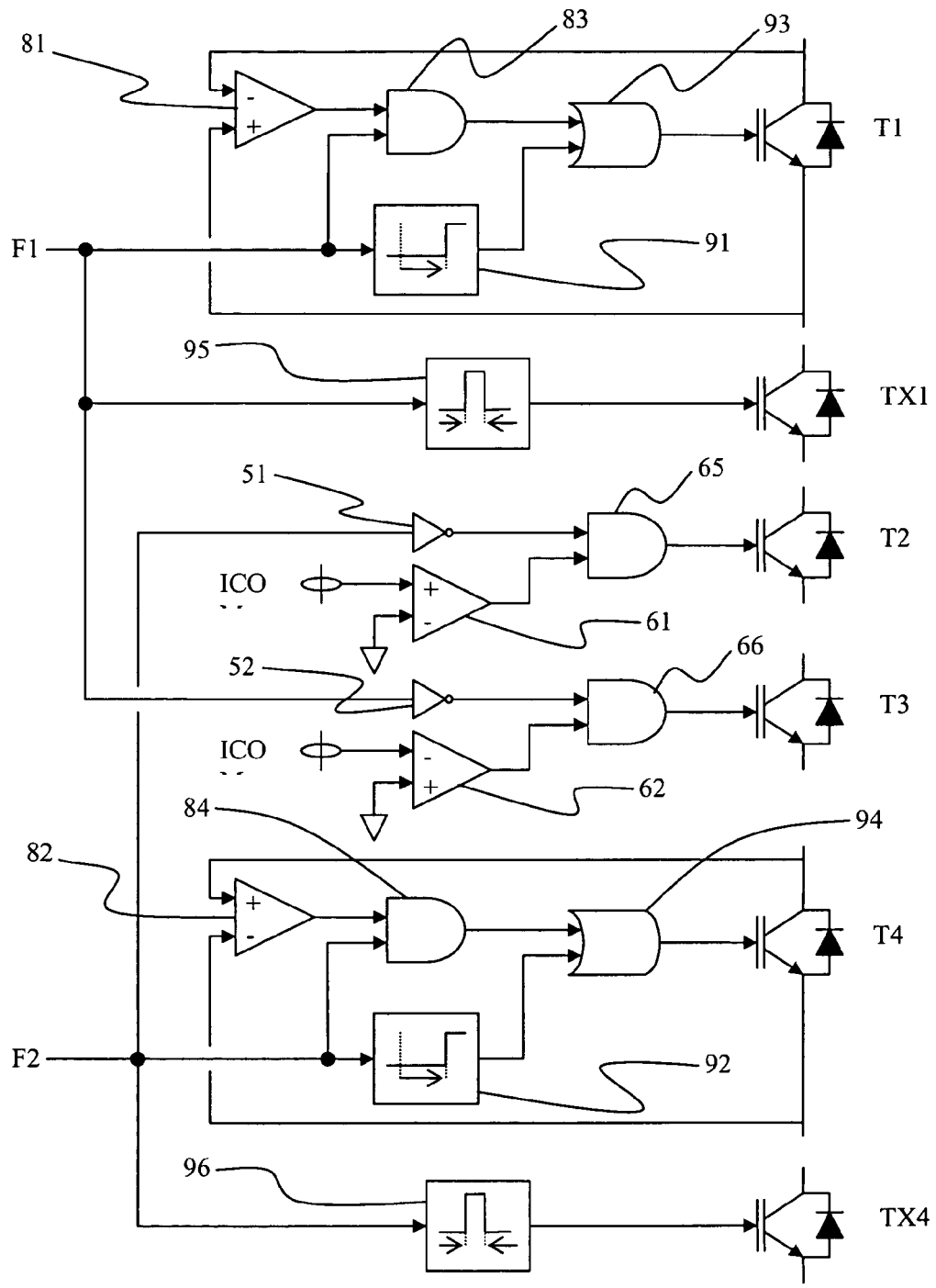
FIG. 5 represents the control unit able to be implemented on the converter device represented in FIG. 4, and also the converter devices represented in FIGS. 6 and 7.

A modified control unit CD2 including the second control means is represented in FIG. 5. As in control unit CD1 represented in FIG. 3, control of each switching unit is performed by means of a pulse width modulation control signal F1, F2 of said switching unit. As described in the foregoing, the amplitude of control signal F1, F2 of a switching unit UC1, UC4 is maintained equal to zero when the sign of AC voltage VS is the opposite of the sign of the voltage on input P, N to which said switching unit is connected. In other words, the amplitude of signal F1 is maintained equal to zero when the sign of AC voltage VS is negative, and the amplitude of signal F2 is maintained equal to zero when the sign of AC voltage VS is positive. As in control unit CD1 represented in FIG. 3, the first control means acting on second switching means T2, T3 associated with one of switching units UC1, UC4 comprises an inverter 51, 52 connected between the control input of said second switching means and an input point of control signal F2, F1 of the other switching unit UC4, UC1.

Control unit CD2 further comprises, for each switching unit, second control means also acting on second switching means T2, T3 associated with switching unit UC1, UC4 that is connected to the voltage input of the same sign as that of AC voltage VS to establish turn-off of said second switching means when said AC voltage VS and AC current IS are of opposite signs. In other words, the second control means act on second switching means T2, respectively T3, associated with switching unit UC1, respectively UC4, to establish turn-off of said second switching means when AC current IS is negative, respectively positive.

The second control means acting on second switching means T2, T3 associated with a first switching unit UC1, UC4 comprise between the control input of said second switching means T2, T3 and the input point of control signal F2, F1 of the other switching unit UC4, UC1:
  means for testing 61, 62 the sign of AC current IS with respect to that of the voltage on input P, N to which said first switching unit UC1, UC4 is connected, and
  a logic "AND" boolean operator 65, 66 provided with two inputs connected to an output of inverter 51 of the first control means of said second switching means T2, T3 and to an output of said means for testing 61, 62 and with an output to establish turn-off of said second switching means when said AC current IS is of opposite sign to that of the voltage on the input to which said first switching unit is connected.

Figure 1:
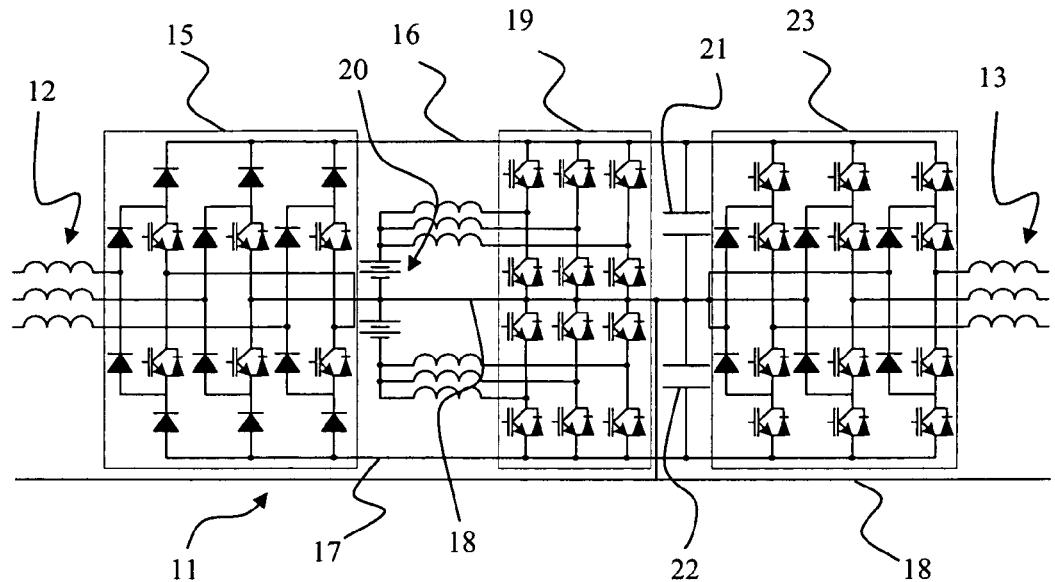
FIG. 1 represents an uninterruptible power supply according to the prior art.
Figure 2:
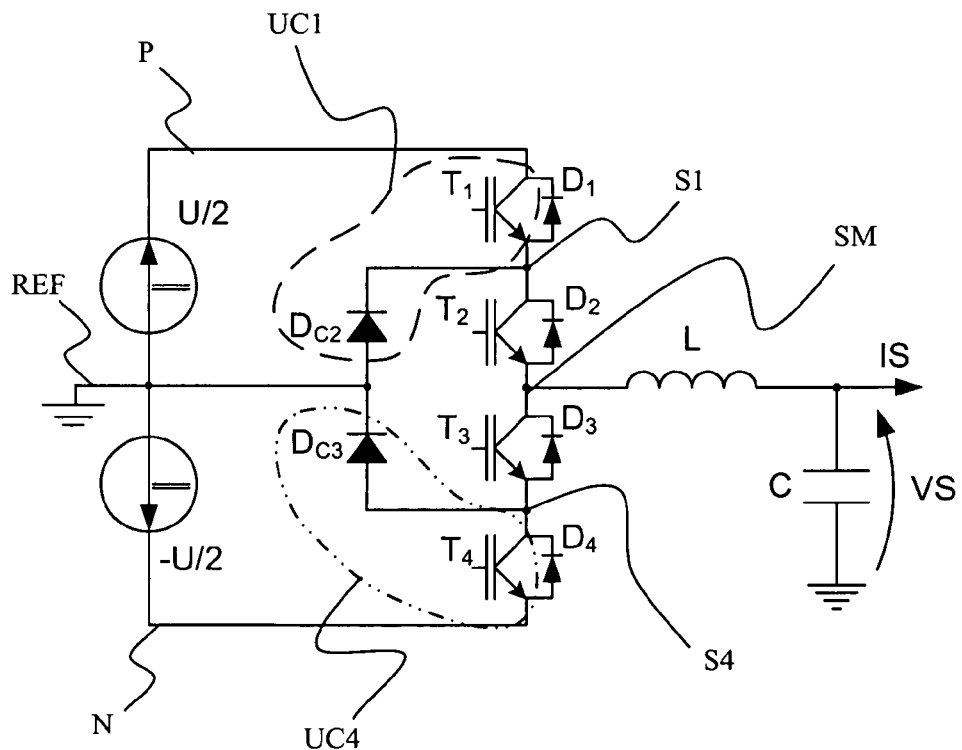
FIG. 2 represents a converter device of DC voltage into AC voltage according to the prior art.
Figure 6:
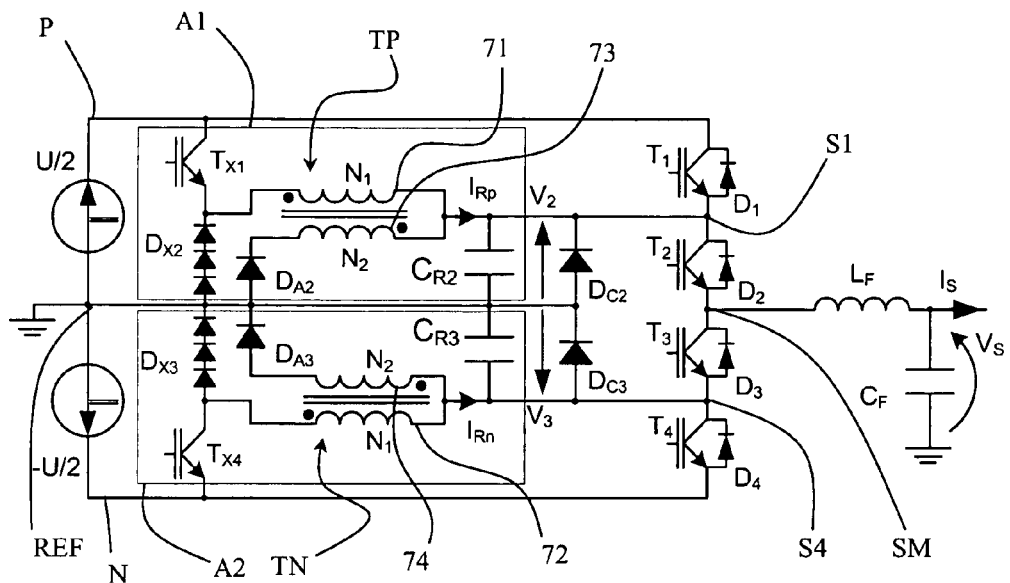
FIG. 6 represents an embodiment of a converter device according to the invention using the control unit represented in FIG. 5.

An example of a switching aid circuit A1, A4 able to be implemented for each switching unit UC1, UC4 is represented in FIG. 6. The converter device represented in FIG. 6 comprises a certain number of the elements already described in the foregoing and indicated by the same reference numbers. As in FIGS. 2 and 4, only the two switching units associated with one of the three phases have been represented.

With reference to FIG. 6, switching aid circuit A1, A4 of each switching unit UC1, UC4 comprises inductive means, branch-off means for tapping current IRP, IRN from switching output S1, S4 to divert said current to said inductive means before main triggering takes place, and a capacitor C2, C3 connected in parallel on diodes DC2, DC3 of said switching unit to establish a resonance of said current IRP, IRN in said inductive means before main triggering takes place.

The inductive means of switching aid circuit A1, A4 of each switching unit UC1, UC4 are essentially formed by a transformer TP, TN connected to switching output S1, S4 of said switching unit and comprising reverse-wound windings. In other words, the two windings of the transformer are directly connected to switching output S1, S4. In the converter device represented in FIG. 6, transformer TP, TN is directly connected to switching output S1, S4 of said switching unit. Due to the fact that the inductive means of each switching aid circuit A1, A4 are essentially formed by a transformer, and that the latter is directly connected to switching output S1, S4, the topology of the converter device and of its switching aid circuits is simplified.

The branch-off means of switching aid circuit A1, A4 of each switching unit UC1, UC4 for their part comprise auxiliary switching means in the form of auxiliary transistors TX1, TX4, directly connected between transformer TP, TN and voltage input P, N to which said switching unit is connected. What is meant by directly connected is that the connection means between the auxiliary transistor and voltage input P, N and between this same auxiliary transistor and transformer TP, TN are essentially formed by electrical conductors. Auxiliary transistors TX1, TX4 participate in establishing a branch-off of AC current IS in transformer TP, TN before main triggering.

More precisely, transformer TP, TN of switching aid circuit A1, A4 of each switching unit UC1, UC4 comprises a first winding 71, 72 connected between switching output S1, S4 of said switching unit and branch-off means TX1, TX4 of said switching aid circuit. Transformer TP, TN comprises a second winding 73, 74 magnetically coupled to first winding 71, 72 and connected between switching output S1, S4 and reference voltage line REF via diode DA2, DA3. This second winding 73, 74 is moreover reverse-wound with respect to first winding 71, 72.

This configuration of transformer TP, TN enables more current to be diverted in each of the windings of transformer TP, TN when auxiliary transistors TX1, TX4 are triggered. Due to the reverse coiling of the windings and to connection of the contiguous ends of said windings to the power supply input, AC current IS is in fact diverted to be shared in each of the windings. Input current IRP, IRN is thereby amplified by mutual induction. This enables the current rating of auxiliary transistor TX1, TX4 to be reduced. After turn-off of diode DC2, DC3, voltage V2, V3 at the terminals of main transistor T1, T4 decreases to a value substantially equal to zero, and diode D1, D4 turns on, which enables said main transistor to be triggered under zero voltage.

In the embodiment represented in FIG. 6, switching aid circuit A1, A4 of each switching unit UC1, UC4 comprises a first blocking diode DX2, DX3 connected between first winding 71, 72 and reference voltage line REF. When auxiliary transistor TX1, TX4 is turned-off, this diode DX2, DX3 enables the current to flow in first winding 71, 72 in a single direction. This diode also enables the voltage at the terminals of auxiliary transistor TX1, TX4 to be limited.

In the embodiment represented in FIG. 6, switching aid circuit A1, A4 of each switching unit UC1, UC4 further comprises a second blocking diode DA2, DA3 connected between second winding 73, 74 and reference voltage line REF. This diode enables the current to flow in a single direction in this second winding. The presence of these diodes DA2, DA3 prevents any reversible operation of the switching aid circuits and enables transformer TP, TN to be demagnetized. This unidirectional operation of switching aid circuit A1, A4 is of interest as it limits the operating time of said switching aid circuit A1, A4 and therefore limits the losses in said circuit.

This configuration of switching aid circuit A1, A4, once main transistor T1, T4 has been triggered, enables transformer TP, TN to be demagnetized, i.e. there is no longer any current flowing in the transformer windings. This prevents energy which would result in destruction of the converter device from accumulating in the transformer. This demagnetization is made possible by diode DX2, DX3 which enables the reference voltage to be applied on winding 71, 72 when auxiliary transistor TX1, TX4 is off and when turn-on of said diode is performed, and by diode DA2, DA3 which withstands the voltage present on winding 73, 74.

Transformer TP, TN generally presents magnetic leaks on each of the windings which can generally not be ignored. An equivalent inductance can thus be defined created by the leaks and this inductance be linked to an equivalent resonance inductance. This resonance inductance determines the rising and falling slope of the current in the transformer windings. Advantageously, transformer TP, TN comprises an electrically insulating material separating the windings. The choice of thickness of this insulating material, among other things, enables the leakage inductance of the transformer and therefore the current slope to be adjusted.

The duty cycle to generate control signals F1, F2 is generally chosen taking account of the demagnetization time of transformer TP, TN, which is generally about one half the triggering time. This prevents saturation of these transformers.

In the embodiment represented in FIG. 6, second switching means T2, T3 of each switching unit UC1, UC4 are connected between switching output S1, S4 of said switching unit and modulated signal output SM.

Figure 7:
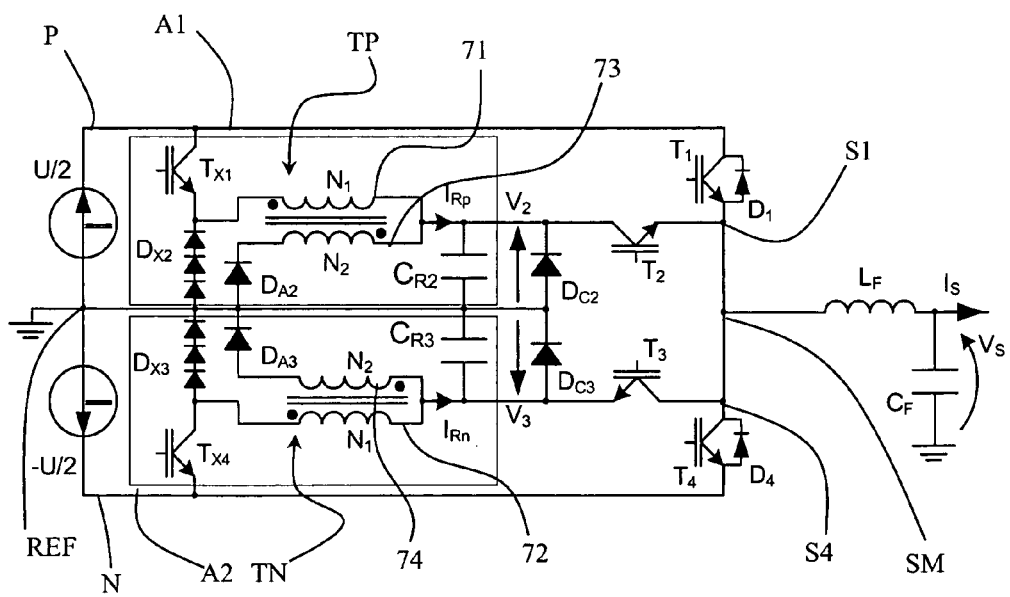
FIG. 7 represents another embodiment of a converter device according to the invention using the control unit represented in FIG. 5.

In the embodiment represented in FIG. 7, the converter device comprises a certain number of the elements already described in the foregoing and indicated by the same reference numbers. Unlike the converter device of FIG. 6, switching output S1, S4 of each switching unit UC1, UC4 is connected to modulated signal output SM. Furthermore, second switching means T2, T3 of each switching unit UC1, UC4 are connected in series between diode DC2, DC3 and modulated signal output SM. This embodiment operates in essentially the same way as that of FIG. 6 using control unit CD2 represented in FIG. 5.

The converter devices represented in FIG. 6 or 7 can generally be used in reversible manner. In other words, the converter device can operate in a rectifier mode enabling a substantially DC voltage to be obtained on DC voltage inputs P, N from AC voltage VS, i.e. as an AC/DC converter.

In the embodiments represented in FIGS. 6 and 7, transistor T1, T4 of each switching unit UC1, UC4 can be used in dual thyristor mode, i.e. triggering takes place in natural manner. In general, main triggering takes place in natural manner when the switching voltage becomes substantially equal to zero and antiparallel diode D1, D4 turns on. For this, control unit CD2 represented in FIG. 5 comprises a comparator 81, 82 for detecting zero crossing of the voltage at the terminals of first switching means T1, T4. The output of this comparator 81, 82 is connected to an input of a first logic "AND" boolean operator referenced 83, 84. What is meant by logic "AND" boolean operator is also a product of logic inputs or a conjunctive binary operator, each of said logic inputs being able to be equal to zero or to one. Another input of this operator is connected to the input point of control signal F1, F2. Zero crossing of the voltage at the terminals of transistor T1, T4 and the simultaneous presence of a pulse of control signal F1, F2 thereby enables the output of this boolean operator 83, 84 to be activated and transistor T1, T4 to be triggered.

However, in rectifier mode and in the case where the intensity of AC current IS is too low, i.e. for an amplitude of AC current IS less than about 10% of its maximum value, which generally corresponds to the beginning or end of a half-wave of said current, the voltage on switching output S1, S4 does not have time to reach the required value of line voltage P, N and natural triggering of main transistors T1, T4 is not possible. Indeed, in this case, capacitors CR2, CR3 do not have time to charge and it is difficult to obtain a resonance of the current entering the inductive means cancelling the voltage at the terminals of main transistors T1, T4.

To remedy this drawback, control unit CD2 represented in FIG. 5 comprises a delay module 91, 92 designed to force delayed main triggering after a period greater than a preset period TMAX. This forced operation mode is implemented in inverse mode, mainly at the beginning and end of the half-wave of AC voltage VS, when the value of AC current IS is not sufficient to charge capacitors CR2, CR3. The output of operator 83, 84 is connected to a second logic "OR" boolean operator referenced 93, 94, the output whereof is connected to the control input of main transistor T1, T4. What is meant by logic "OR" boolean operator is also a disjunctive binary operator, each of said logic inputs being able to be equal to zero or to one. Thus, in normal operation, when the output of "AND" operator 83, 84 is activated, the output of operator 93, 94 is also activated, which enables triggering of main transistor T1, T4 to be commanded at the moment the voltage at the terminals of said transistor crosses zero.

Control unit CD2 represented in FIG. 5 further comprises a module 95, 96 enabling auxiliary transistor TX1, TX4 to be triggered during a preset period TMAX'. This period runs from the rising front of control signal F1, F2. In normal operation and during this period TMAX', auxiliary transistor TX1, TX4 can therefore be triggered, which enables the switching voltage to be cancelled to trigger main transistor T1, T4.

Figure 3:
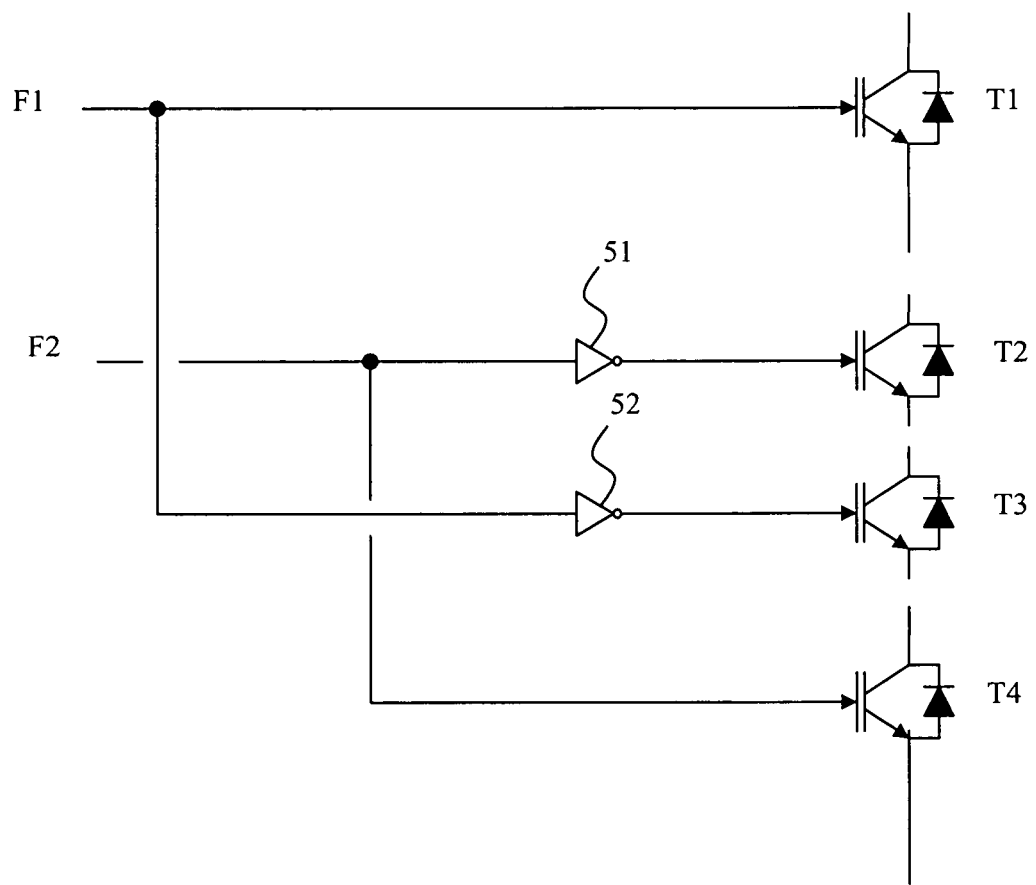
FIG. 3 represents the control unit of the converter device represented in FIG. 2.

With reference to FIGS. 8A to 8H and for the purposes of comparison with the converter device according to the invention, operation of the converter device represented in FIG. 6 associated with control unit CD1 represented in FIG. 3 (prior art) is described in the following in the case where AC voltage VS is positive and AC current IS is negative. It should be noted that the description of this operation also applies to the converter device represented in FIG. 7.

Figure 8A:
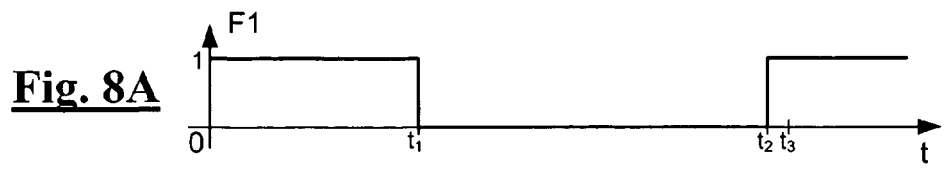
FIGS. 8A to 8H are timing diagrams illustrating operation of the converter device represented in FIG. 6 or 7 when the AC voltage and current are of opposite signs and in the particular case where a control unit according to the prior art as represented in FIG. 3 is used.
Figure 8B:
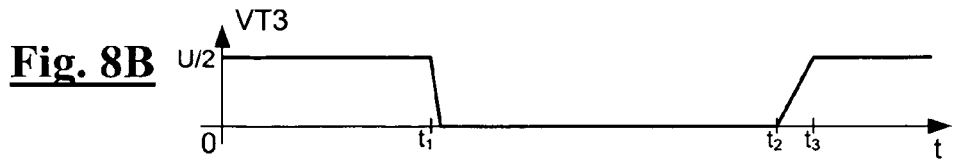
Figure 8C:
Figure 8D:
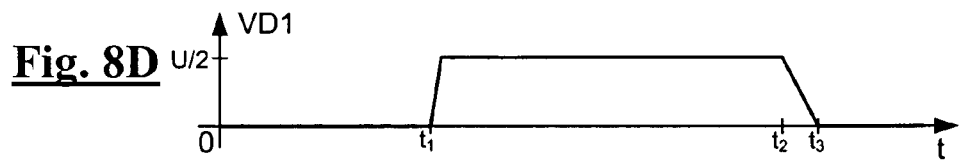
Figure 8E:
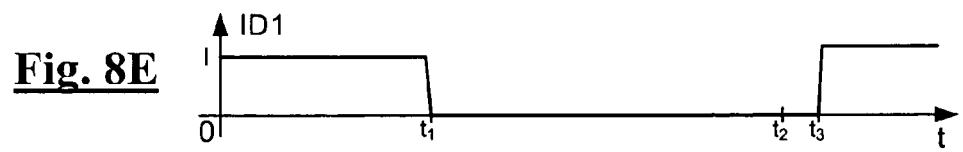
Figure 8F:
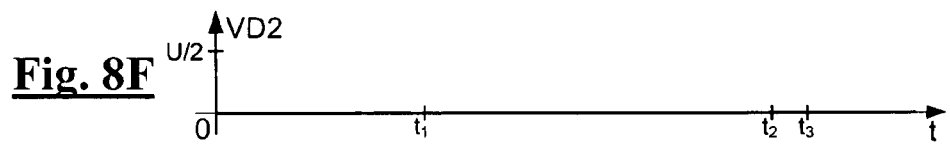
Figure 8G:
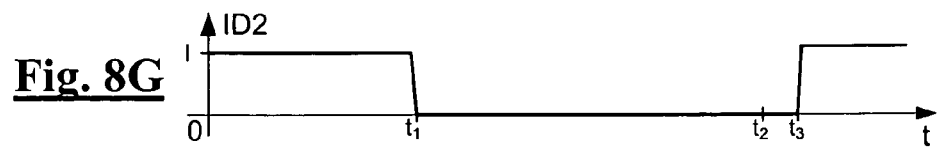
Figure 8H:
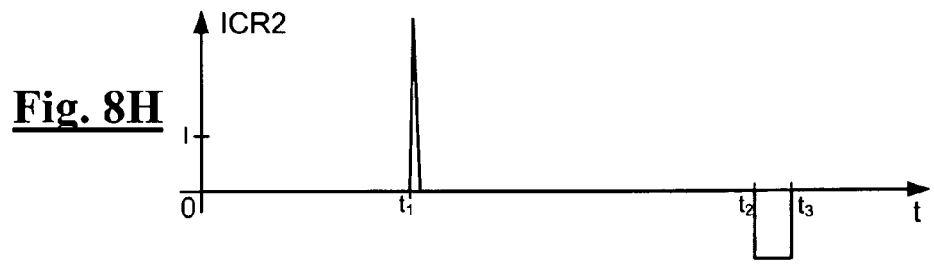

So long as control signal F1 is equal to one, transistor T1 is in on state and transistor T3 is maintained in off state by means of inverter 51. AC current IS flows in diodes D1 and D2 (FIGS. 8E and 8G). Voltage VCR2 at the terminals of capacitor CR2 is for its part equal to voltage U/2 on input P.

At a time t1, control signal F1 goes from one to zero, transistor T1 is turned-off and transistor T3 turns on. It should be noted that transistor T2 is kept turned-on throughout the positive half-wave due to the presence of inverter 52 and to the fact that control signal F2 on input of said inverter is kept equal to zero throughout the positive half-wave. This results in voltage VCR2 at the terminals of capacitor CR2 being cancelled by discharging of said capacitor CR2 through transistor T2. The value of current IT3 and IT2 flowing in transistor T3 and T2 thereby becomes very high (FIG. 8C) which may be detrimental to their integrity. Transistor T2 being turned-on throughout period during which AC current IS is negative and AC voltage VS is positive, voltage VD1 at the terminals of D1 is maintained equal to voltage U/2 on input P (FIG. 8D). It is therefore diode D1 that withstands the whole of voltage U/2 of input P. The current therefore flows in transistor T3 (FIG. 8C) and in diode DC3.

At a time t2, control signal F1 goes from zero to one, transistor T1 turns on and transistor T3 turns off. This results in the current being diverted to capacitor CR2 via diode D2 (FIG. 8G), which slows down the rise of voltage VT3 at the terminals of transistor T3 (FIG. 8B).

At a time t3, capacitor CR2 is charged and presents a voltage VCR2 at its terminals equal to voltage U/2 on input P. AC current IS flows in diodes D1 and D2 (FIGS. 8E and 8G).

With reference to FIGS. 9A to 9H, operation of the converter device represented in FIG. 6 associated with control unit CD2 represented in FIG. 5 is described in the following, still in the case where AC voltage VS is positive and AC current IS is negative, i.e. during the reactive phases. This operation can be transposed to the case where voltage VS is negative and current IS is positive, T2 then operating as T3 in the following and vice-versa.

It should be noted that the description of this operation also applies to the converter device represented in FIG. 7.

Figure 9A:
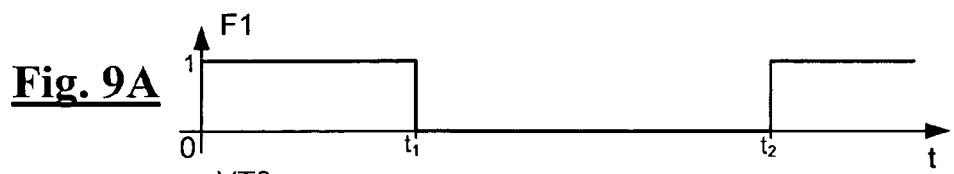
FIGS. 9A to 9H are timing diagrams illustrating operation of the converter device represented in FIG. 6 or 7 with a control unit according to the invention as represented in FIG. 5, and when the AC voltage and current are of opposite signs.
Figure 9B:
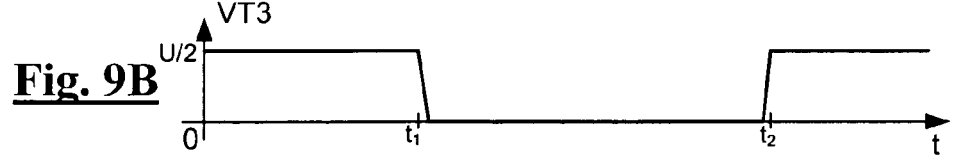
Figure 9C:
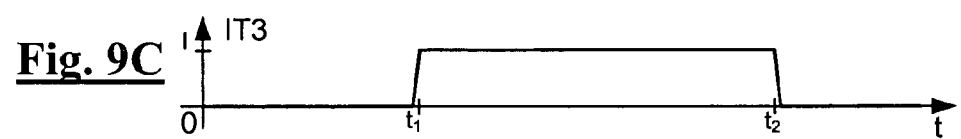
Figure 9D:
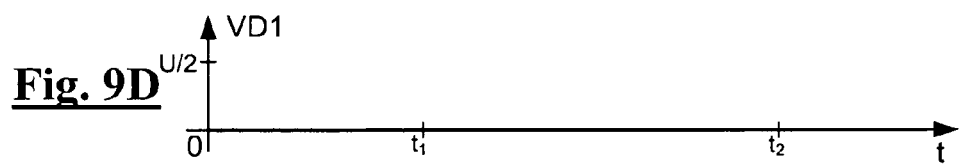
Figure 9E:
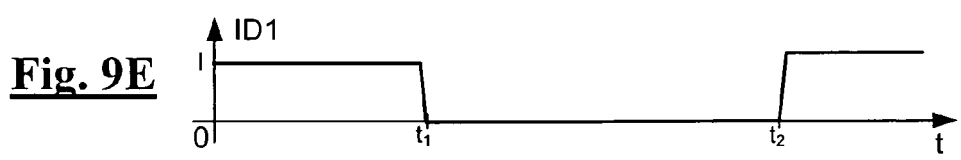
Figure 9F:
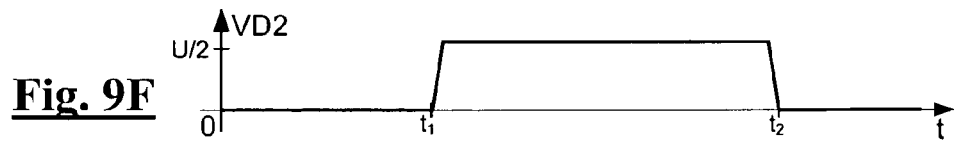
Figure 9G:
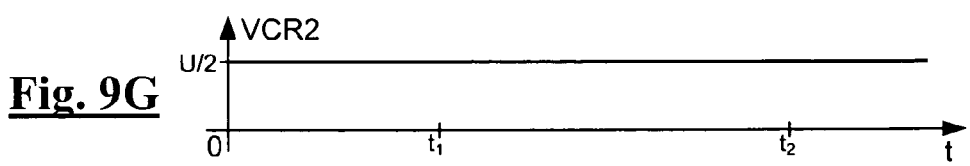
Figure 9H:
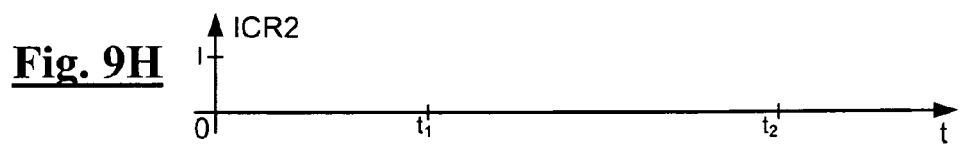

So long as control signal F1 is equal to one, transistor T1 is on and transistor T3 is kept off by means of inverter 51. AC current IS flows in diodes D1 and D2 (FIG. 9E). Voltage VCR2 at the terminals of capacitor CR2 is for its part equal to voltage U/2 on input P (FIG. 9G).

At time t1, control signal F1 goes from one to zero, transistor T1 is turned off and transistor T3 turns on as was the case previously. Moreover, the output of inverter 52 is kept equal to one due to the fact that, throughout the positive half-wave of voltage VS, control signal F2 is kept equal to zero. In parallel, the sign of the AC current enables the output of comparator 61 to be kept at zero. This results in the output of logic "AND" boolean operator 65 being equal to zero and transistor T2 being turned-off. Second control means 61, 65 therefore enable transistor T2 to be turned off, which prevents the current originating from discharging of capacitor CR2 from flowing. Capacitor CR2 therefore remains charged (FIG. 9G) and the voltage at the terminals of diode D1 is maintained equal to zero (FIG. 9E). It is therefore diode D2 that withstands the whole of voltage U/2 of input P when transistor T3 is on (FIG. 9F).

As previously, at time t2, control signal F1 goes from zero to one, transistor T1 turns on and transistor T3 turns off. The current is diverted in diode D2.

At time t2, AC current IS flows in diodes D1 and D2 (FIG. 9E).

The use of control unit CD2 represented in FIG. 5, in particular of second control means 61, 62, 65, 66 of said control unit, enables current IT3, IT2 flowing in transistor T3, T2 to be limited preventing discharging of capacitor CR2, CR3. Transistor T3 therefore does not need to be over-dimensioned to withstand a current to which a discharge current of capacitor CR2, CR3 would be added.

With reference to the timing diagrams of FIGS. 10A to 10L, operation of the converter device represented in FIG. 6 or in FIG. 7 is described in the following. It should be noted that these timing diagrams extend over a period during which AC voltage and current VS, IS can be considered as being continuous. The following description is limited to operation during the positive half-waves of AC voltage VS, i.e. essentially to operation of switching unit UC1 and of switching aid circuit A1. Operation of the converter device during the negative half-waves of AC voltage VS can be easily derived therefrom by the person skilled in the trade. The following description is made for the case where AC voltage VS and AC current IS are of the same sign, i.e. when the switching aid circuit is used to obtain soft switching of main transistors T1, T4. Furthermore, the following description applies to rectifier mode of the converter device, i.e. to the DC/AC mode of operation, a condition also being that the intensity of AC current IS is sufficient to obtain natural turn-on of transistors T1, T4. In other words, the operation described hereafter to a certain extent excludes rectifier mode for the beginning and end of the half-waves of AC voltage VS.

Figure 10A:
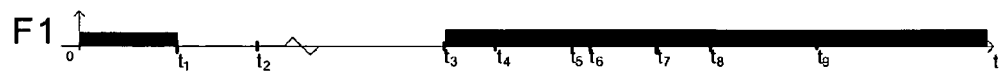
FIGS. 10A to 10L are timing diagrams illustrating operation of the converter device according to the invention represented in FIG. 6 or 7 when the AC voltage and current are of the same sign.
Figure 10B:
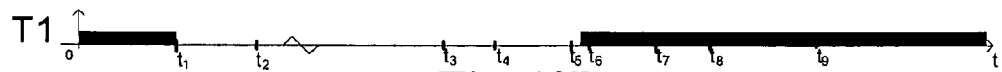
Figure 10C:
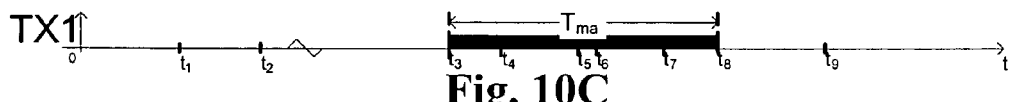
Figure 10D:
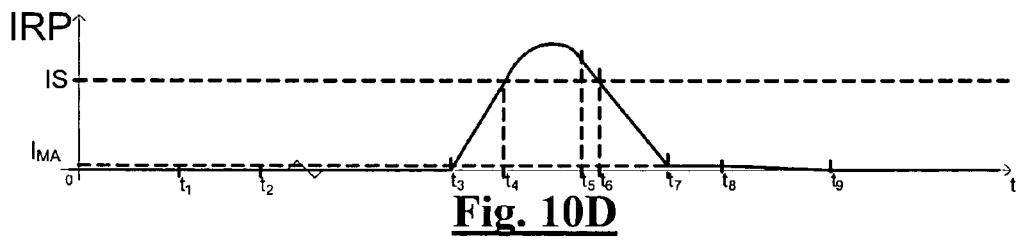
Figure 10E:
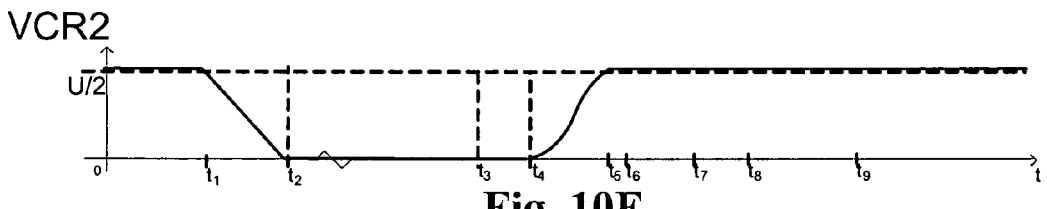
Figure 10F:
Figure 10G:
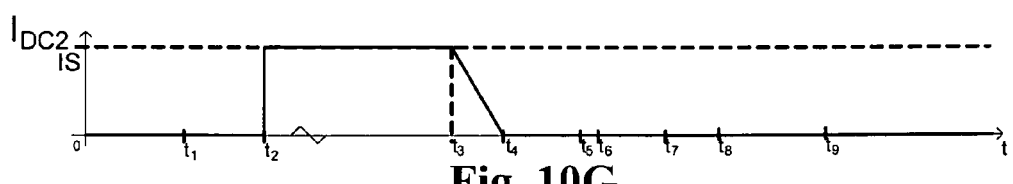
Figure 10H:
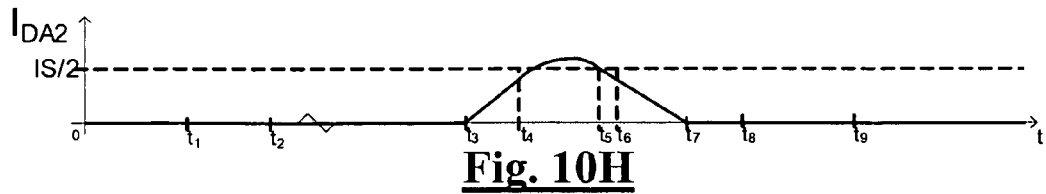
Figure 10I:
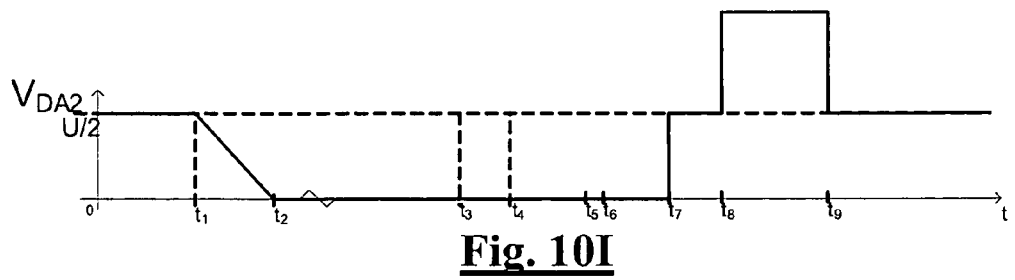

Main transistor T1 is initially in a triggered or on state, which is indicated by the presence of a bold line in FIG. 10B. Auxiliary transistor TX1 is for its part in off state, which is indicated by the absence of a bold line in FIG. 10C. As can be seen in FIG. 10G, diode DC2 is turned-off. Transistor T1 sees a current IT1 flow, represented in FIG. 10F, that is substantially equal to AC current IS. Voltage V1 at the terminals of transistor T1 is thereby substantially equal to zero, and voltage VCR2 at the terminals of capacitor CR2 is substantially equal to voltage U/2 on input P (FIG. 10E). Diode DA2 does not see any current flow as is represented in FIG. 10H and is in off state. Voltage VDA2 at its terminals represented in FIG. 10I is therefore substantially equal to the value of voltage U/2 on input P.

Figure 10J:
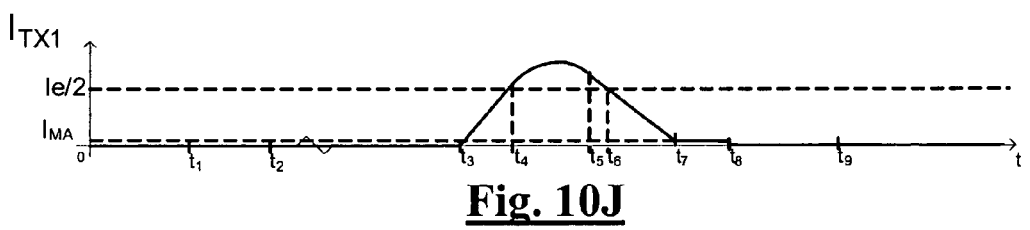
Figure 10K:
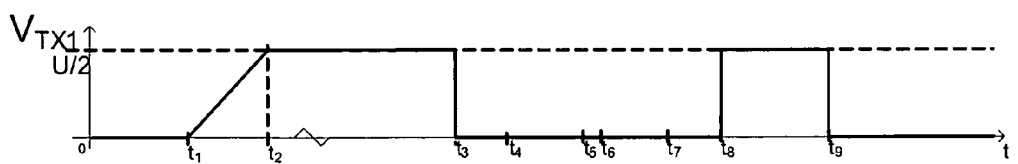
Figure 10L:
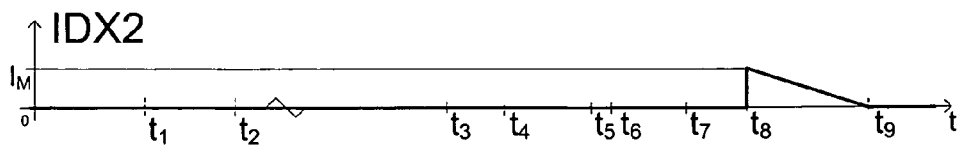

At time t1, transistor T1 is off (FIG. 10B), and AC current IS is diverted in capacitor CR2. Voltage V1 at the terminals of main transistor T1 starts to increase progressively discharging capacitor CR2, as can be seen in FIG. 10E. Diode DA2 is still in off state and voltage VDA2 at its terminals starts to decrease (FIG. 10I) until it reaches a zero value. At the same time, as can be seen in FIG. 10L, voltage VTX1 at the terminals of auxiliary transistor TX1 increases to the value of voltage U/2 on input P.

At time t2, voltage VCR2 at the terminals of capacitor CR2 reaches the value of the reference voltage (FIG. 10E) and diode DC2 starts to conduct a current IDC2 the value of which is substantially equal to the value of current IS represented in FIG. 10G.

At time t3, auxiliary transistor TX1 is triggered (FIG. 10C), which will result in a decrease of current IDC2 in diode DC2 (FIG. 10G) which is diverted to auxiliary transistor TX1 which has turned on. As can be seen in FIG. 10J, auxiliary transistor TX1 therefore sees a current ITX1 that increases progressively. Current IRP in transformer TP, represented in FIG. 10D, will therefore increase at the same time as current IDC2 decreases. After triggering of diode DA2, this current IRP results from the sum of current ITX1 in first winding 71 of transformer TP (FIG. 10J) and of current IDA2 in second winding 73 of this same transformer TP (FIG. 10H). As soon as diode DA2 is triggered, voltage U/2 on input P is applied to the two windings 71, 73 of transformer TP. On account of the magnetic losses of this transformer, winding 73 will be subjected to a voltage at its terminals that is substantially equal to voltage U/2 on input P. The transformation ratio of transformer TP being very close to one, current ITX1 in winding 71 represented in FIG. 10J and current IDA2 in winding 73 represented in FIG. 10H are substantially equal to half the value of current IRP entering transformer TP, i.e. equal to half of AC current IS.

At time t4, there is no longer any current flowing in diode DC2, which results in the latter being turned off (FIG. 10G). Voltage V2 at the terminals of capacitor CR2 (FIG. 10E) therefore starts to increase by resonance phenomenon with transformer TP. At the same time, as can be seen in FIGS. 10D, 10H, and 10J, current IRP on the input of transformer TP and currents IDA2 and ITX1 in each winding will increase. In this way, current IRP in the transformer will enter into resonance. Indeed, at time t4, capacitor CR2 which is discharged will charge progressively as voltage V2 at its terminals increases to reach the voltage of input P.

Between times t4 and t5, when voltage V2 at the terminals of capacitor CR2 is substantially equal to half the voltage U/2 on input P, current IRP entering transformer TP will reach a resonance peak (FIGS. 10D and 10E). During this lapse of time, the voltage at the terminals of winding 71 of transformer TP will decrease and the voltage at the terminals of winding 73 of this same transformer will increase. In other words, due to the variation of voltage V2, voltage U/2 on input P will simultaneously switch from winding 71 to winding 73.

At time t5, whereas voltage V2 at the terminals of capacitor CR2 is equal to voltage U/2 on input P (FIG. 10E), a weak current will flow in reverse-connected diode D1 parallel to transistor T1. This can be seen in FIG. 10F representing current IT1 flowing in the module formed by main transistor T1 and diode D1. Main transistor T1 is triggered between time t5 and time t6 with a voltage at its terminals that is therefore substantially equal to zero (FIG. 10E). The power dissipated when this triggering takes place is therefore minimized.

At time t6, current IT1 in main transistor T1 increases progressively (FIG. 10F) and at the same time the intensity of currents ITX1 and IDA2 in respectively first and second winding 71, 73 decrease (FIGS. 10J and 10H).

At time t7, there is no longer any current flowing in diode DA2 and in second winding 73 of transformer TP (FIG. 10H), which results in turn-off of said diode. A current of low intensity IMAG represented in FIG. 10J, due to magnetization of transformer TP, continues to flow in transistor TX1 and in first winding 71 of said transformer. Between time t7 and time t8, the voltages at the terminals of windings 71, 73 of transformer TP being substantially equal to zero, the value of this current IMAG remains substantially constant.

At time t8, transistor TX1 is commanded to off state (FIG. 10C) and diode DX2 enables magnetization current IMAG flowing in first winding 71 to be completely evacuated. Full demagnetization of transformer TP thus takes place before main turn-off of main transistor T1. As can be seen in FIG. 10L, the value of the voltage at the terminals of transistor TX1 is substantially equal to voltage U/2 on input P. As can be seen in FIG. 10I, the voltage at the terminals of diode DA2 is for its part substantially equal to twice the value of voltage U/2 on input P. During demagnetization of transformer TP, voltage VTX1 at the terminals of auxiliary transistor TX1 is therefore twice as low as voltage VDA2 at the terminals of diode DA2. It is therefore diode DA2 that absorbs a high demagnetization voltage instead of auxiliary transistor TX1, which enables a transistor TX1 of lower rating to be chosen, which is therefore less costly and which operates with a lower power consumption.

At time t9, transformer TP is fully demagnetized, i.e. the mean value of the voltage at its terminals is zero. Current IMAG therefore becomes zero and diode DX2 turns off. The initial situation preceding time t1 is thus reverted to.

With reference to the timing diagrams of FIGS. 11A to 11K, operation in rectifier mode of the converter device represented in FIG. 6 or in FIG. 7, i.e. DC/AC operating mode of said converter, is described in the following in the case where the intensity of AC current IS is not sufficient to obtain natural turn-on of transistors T1, T4. The operation described hereafter is therefore applicable to the beginning and end of the half-wave of AC current IS. It should be noted that these timing diagrams extend over a period during which AC voltage and current VS, IS can be considered as being continuous. The following description is limited to operation during the positive half-waves of AC voltage VS, operation during the negative half-waves of said AC voltage VS being able to be easily derived therefrom by the person skilled in the trade.

Figure 11A:
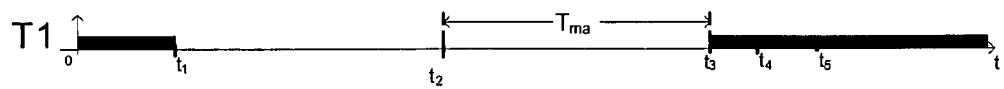
FIGS. 11A to 11K are timing diagrams illustrating operation in rectifier mode of the converter device according to the invention represented in FIG. 6 or 7, when the AC voltage and current are of the same sign, at the beginning and at the end of a half-wave of said AC voltage.

At the outset, transistor T1 is triggered or on, as can be seen in FIG. 11A. Transistor T1 conducts a current IT1 represented in FIG. 11E the value of which is substantially equal to that of AC current IS. As can be seen in FIGS. 11D and 11F, the value of voltage VCR2 at the terminals of capacitor CR2 is almost zero and diode DC2 is in off state.

At time t1, main transistor T1 goes from on state to off state (FIG. 11A) and AC current IS is diverted in capacitor CR2. Voltage VCR2 at the terminals of capacitor CR2 starts to decrease progressively discharging capacitor CR2, and voltage V1 at the terminals of main transistor T1 increases progressively, as can be seen in FIG. 11D. The intensity of AC current IS being too low, voltage V1 at the terminals of transistor T1 increases very slowly and does not manage to reach the value of voltage U/2 on input P. Diode DC2 can therefore not be triggered and therefore does not conduct (FIG. 11F).

Figure 11B:
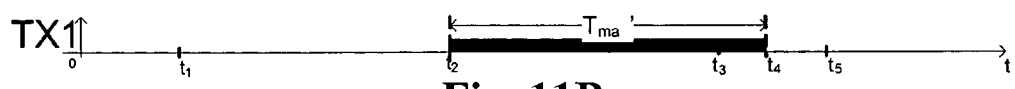
Figure 11C:
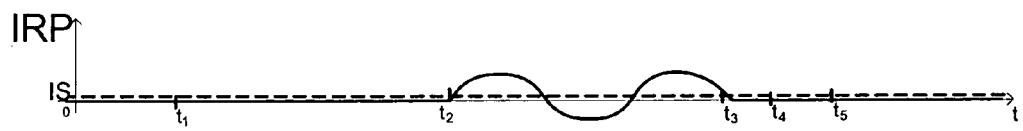
Figure 11D:
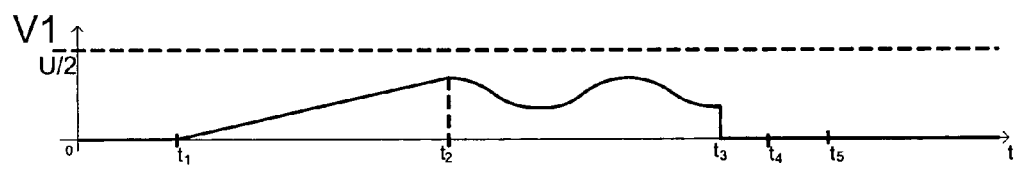
Figure 11E:
Figure 11F:
Figure 11G:
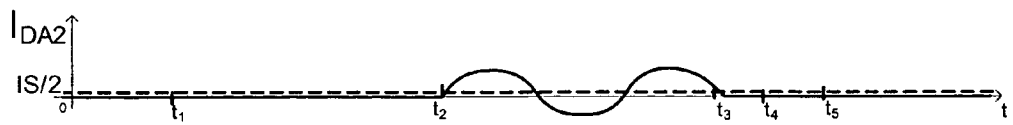
Figure 11H:
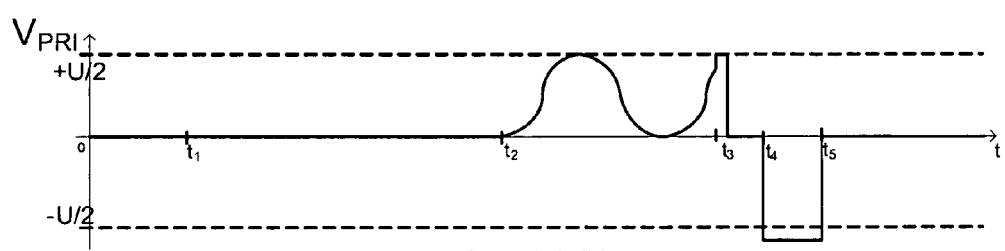
Figure 11I:
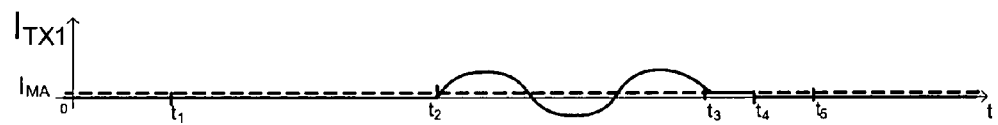

At time t2, auxiliary transistor TX1 is triggered (FIG. 11B). As can be seen in FIG. 11I, auxiliary transistor TX1 therefore sees a current ITX1 which increases progressively. In the same way, current IRP in transformer TP (FIG. 11C) and current IDA2 in diode DA2 (FIG. 11G) increase. Current IRP in transformer TP will then enter a resonance phase. Capacitor CR2 which is initially charged will in fact discharge progressively as voltage V1 at the terminals of main transistor T1 decreases to zero. Current IRP in transformer TP will then reach a resonance peak (FIG. 11C) which will then continue with a drop. As can be seen in FIGS. 11C, 11D, 11G, 11H, 11I and 11K, the resonance phase results in oscillations without voltage V1 at the terminals of main transistor T1 being able to be cancelled. Transistor T1 can therefore not trigger due to the fact that the outputs of comparator 81 and of logic "AND" boolean operator 83 of control unit CD2 remain in an inactive state.

At time t3, after the lapse of time TMAX defined by delay module 91 of control means CD2, main transistor T1 is triggered automatically (FIG. 11A) due to the fact that the output of logic "OR" boolean operator 93 switches to active state. At the same time, voltage V1 at the terminals of main transistor T1 is sharply brought to zero (FIG. 11D), which generates a current peak in main transistor T1 (FIG. 11E). Current IRP decreases (FIG. 11C) and diode DA2 reverts to off state (FIG. 11G). Only a magnetizing current IMAG flows in transistor TX1 (FIG. 11I).

Figure 11J:
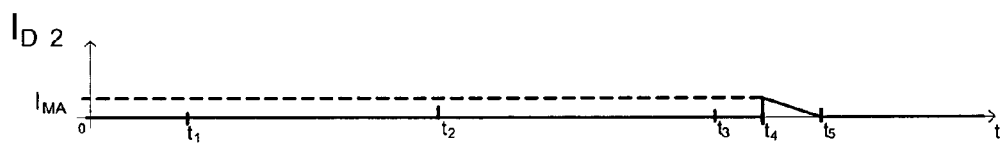
Figure 11K:
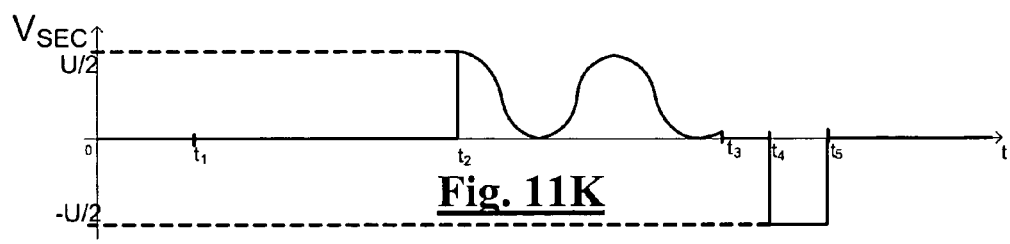

At time t4, after a period TMAX' defined by module 95 of control unit CD2 and usually greater than the time TMAX, auxiliary transistor TX1 is turned off (FIG. 11B). Diode DX2 enables full demagnetization of transformer TP to be achieved at time t5 (FIGS. 11H, 11I and 11J).

At time t5, transformer TP is fully demagnetized. Current IMAG therefore becomes zero and diode DX2 turns off (FIG. 11J). The initial situation preceding time t1 is therefore reverted to.

Figure 12:
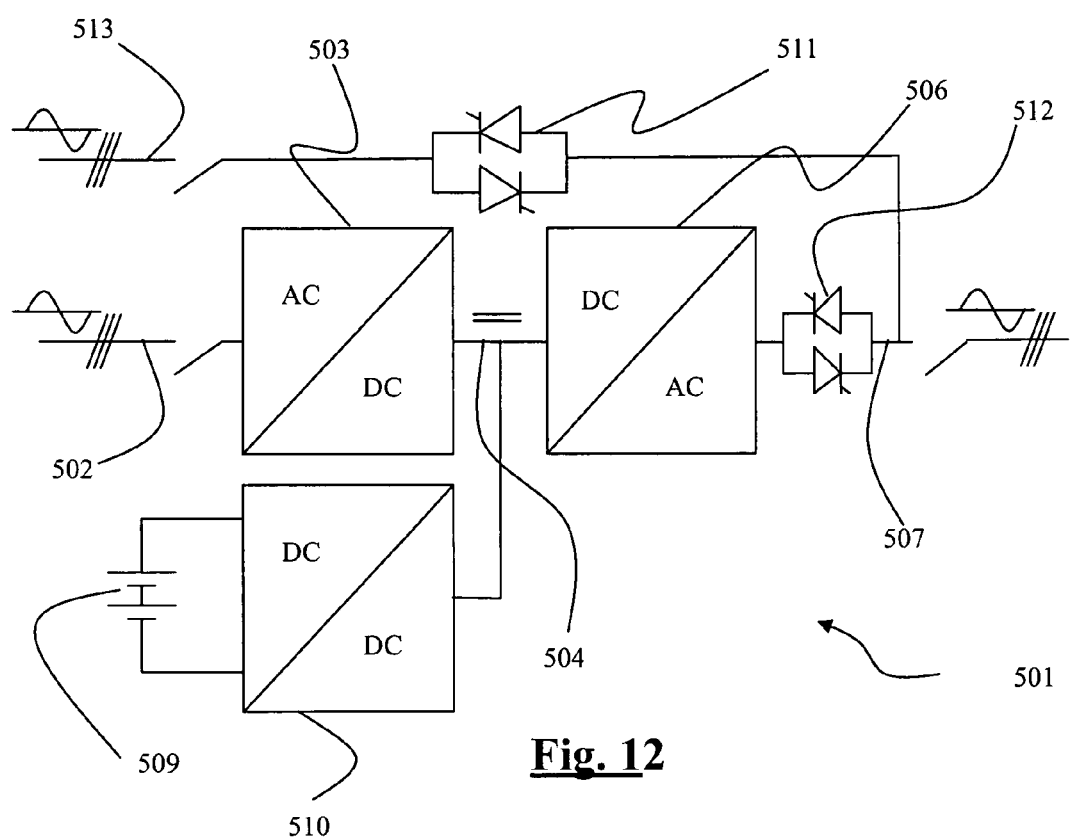
FIG. 12 represents an uninterruptible power supply according to the invention.

The converter devices described above can be used in an uninterruptible power supply 501 as represented in FIG. 12. This uninterruptible power supply comprises a power supply input 502 on which a variable input voltage from a first three-phase power system is applied. The uninterruptible power supply comprises a rectifier 503, said rectifier being connected between power supply input 502 on the one hand and two substantially DC output lines 504 or voltage busses on the other hand. The uninterruptible power supply comprises an inverter 506 corresponding to one of the converter devices described above, said inverter being connected between output lines 504 and an output 507 designed to supply a backed-up three-phase AC voltage to a load 508. DC voltage bus 504 is also connected to a battery 509 via a DC/DC converter 510.

As can be seen in FIG. 12, static switches 511 and 512 enable selection of either power supply input 502 of the first three-phase power system or a power supply input 513 of a second power system that is also three-phase. It is thus possible to supply the load by means of the backed-up first power system via uninterruptible power supply 501, and to switch over to the second power system if required.

The invention claimed is:

1. A converter device for supplying an AC voltage and current by filtering pulses obtained on a modulated signal output from three substantially DC voltages available on a reference voltage line and on two voltage inputs of opposite signs, said device comprising two switching units connected between said reference voltage line and respectively one and the other of said inputs, each switching unit comprising first switching means connected between the input to which said switching unit is connected and a switching output of said switching unit to supply pulses having the same sign as that of the voltage available on said input by main turn-ons and turn-offs of said first switching means, said device comprising, for each switching unit, second switching means associated with said switching unit and connected between said switching unit and said modulated signal output, and first control means acting on said second switching means to establish turn-on of said second switching means when the sign of said AC voltage is the same as that of the voltage on the input to which said switching unit is connected, wherein, for each switching unit, said device comprises a switching aid circuit of said switching unit connected between the input to which said switching unit is connected and the switching output of said switching unit to establish a switching voltage of said first switching means that is substantially equal to zero, before any main turn-on of the first switching means of said switching unit, for each switching unit said device comprises second control means acting on the second switching means associated with the switching unit that is connected to the voltage input of the same sign as that of said AC voltage to establish turn-off of said second switching means when said AC voltage and said AC current are of opposite signs, wherein each switching unit further comprises a diode connected between the reference voltage line and the switching output of said switching unit to establish a voltage equal to said reference voltage on said switching output when main turn-off takes place, wherein the switching aid circuit of each switching unit comprises inductive means, branch-off means for shunting a current from the switching output to divert said current to said inductive means before main turn-on, and energy storage means connected in parallel on the diode of said switching unit to establish a resonance of a current in said inductive means before main turn-on, and wherein the inductive means of the switching aid circuit of each switching unit consist essentially of a transformer connected to the switching output of said switching unit and comprising reverse-wound windings, and said branch-off means comprise auxiliary switching means directly connected between said inductive means and the voltage input to which said switching unit is connected.

2. A device according to claim 1, wherein the second switching means of each switching unit are connected between the switching output of said switching unit and the modulated signal output.

3. A device according to claim 2, wherein each switching unit is controlled by means of a pulse width modulation control signal the amplitude of which is maintained at a value substantially equal to zero when the sign of the AC voltage is opposite to the sign of the voltage on the input to which said control unit is connected, and the first control means acting on the second switching means associated with one of the switching units comprise an inverter connected between the control input of said second switching means and an input point of the control signal of the other switching unit.

4. A device according to claim 3, wherein the second control means acting on the second switching means associated with a switching unit comprise between the control input of said second switching means and the input point of the control signal of the other switching unit:

means for testing the sign of the AC current with respect to that of the voltage on the input to which said first switching unit is connected, and a logic "AND" boolean operator provided with two inputs connected to an output of the inverter of the first control means of said second switching means and to an output of said means for testing and with an output to establish turn-off of said second switching means when said AC current is of opposite sign to that of the voltage on the input to which said first switching unit is connected.

5. A device according to claim 1, wherein the switching output of each switching unit is directly connected to the modulated signal output, and the second switching means of each switching unit are connected in series between the diode and said modulated signal output.

6. A device according to claim 1, wherein the transformer of the switching aid circuit of each switching unit comprises:

a first winding connected between the switching output of said switching unit and the branch-off means of said switching aid circuit, and a second winding magnetically coupled to said first winding and connected between said switching output and the reference voltage line.

7. A device according to claim 6, wherein the switching aid circuit of each switching unit comprises at least a first blocking diode connected between the first winding and the reference voltage line.

8. A device according to claim 7, wherein the switching aid circuit of each switching unit comprises a second blocking diode connected between the second winding and the reference voltage line.

9. A device according to claim 1, wherein the transformer presents a transformation ratio of less than one.

10. A device according to claim 1, wherein said device comprises third control means acting on the first switching means of each switching unit, said third control means being connected between the input point of the pulse width modulation control signal of said switching unit and the control input of said first switching means, said third control means enabling a succession of main turn-ons and turn-offs of said first switching means to be commanded from said control signal, said third control means comprising a delay module designed to establish a delayed main turn-on after a period greater than a preset period.

11. A device according to claim 1, wherein said device comprises fourth control means acting on the auxiliary switching means of the switching aid circuit of each switching unit, said fourth control means being connected between the input point of the pulse width modulation control signal of said switching unit and the control input of said auxiliary switching means, said fourth control means comprising a module designed to establish turn-on of said auxiliary switching means during a preset period.

12. A converter device according to claim 1 in combination with additional elements, for outputting a backed-up AC voltage as an uninterruptible power supply, said additional elements comprising a rectifier having an AC input and a plurality of DC outputs, and two electrically conductive lines connected to said device for supplying DC voltages of opposite signs to said device from outputs of the rectifier having an AC input.

* * * * *